United States Patent
Klein et al.

(10) Patent No.: US 8,898,400 B2
(45) Date of Patent: Nov. 25, 2014

(54) INTEGRATED CIRCUIT INCLUDING MULTIPLE MEMORY DEVICES

(75) Inventors: Ralf Klein, Burlington, VT (US); Jong Hoon Oh, Chapel Hill, NC (US)

(73) Assignee: Infineon Technologies AG, Neubiberg (DE)

( * ) Notice: Subject to any disclaimer, the term of this patent is extended or adjusted under 35 U.S.C. 154(b) by 950 days.

(21) Appl. No.: 11/781,374

(22) Filed: Jul. 23, 2007

(65) Prior Publication Data

US 2009/0031077 A1 Jan. 29, 2009

(51) Int. Cl.
 *G06F 12/00* (2006.01)
 *G06F 13/00* (2006.01)
 *G06F 13/28* (2006.01)
 *G06F 13/42* (2006.01)

(52) U.S. Cl.
 CPC .................................. *G06F 13/4239* (2013.01)
 USPC ........................................................ 711/154

(58) Field of Classification Search
 CPC ................................................... G06F 13/4239
 USPC ........................................................ 711/154
 See application file for complete search history.

(56) References Cited

U.S. PATENT DOCUMENTS

| | | | |
|---|---|---|---|
| 5,893,168 A | | 4/1999 | Qureshi et al. |
| 5,918,242 A | * | 6/1999 | Sarma et al. ...................... 711/5 |
| 6,381,715 B1 | * | 4/2002 | Bauman et al. ................ 714/718 |
| 7,036,004 B2 | | 4/2006 | Zitlaw et al. |
| 2003/0021139 A1 | * | 1/2003 | Nakamura et al. .............. 365/63 |
| 2003/0169733 A1 | * | 9/2003 | Gurkowski et al. ........... 370/382 |
| 2004/0049629 A1 | * | 3/2004 | Miura et al. ................... 711/105 |
| 2005/0005053 A1 | * | 1/2005 | Jang ................................. 711/1 |
| 2005/0068799 A1 | * | 3/2005 | Bedwell et al. ................. 365/63 |
| 2006/0171241 A1 | * | 8/2006 | Nam ........................ 365/230.06 |
| 2006/0184782 A1 | | 8/2006 | Zitlaw et al. |
| 2007/0008789 A1 | * | 1/2007 | Kwak ....................... 365/189.05 |
| 2009/0302913 A1 | * | 12/2009 | Chung et al. .................. 327/198 |

\* cited by examiner

*Primary Examiner* — Sheng-Jen Tsai
(74) *Attorney, Agent, or Firm* — John S. Economou (57) ABSTRACT

An integrated circuit includes a data bus and a first memory device coupled to the data bus. The first memory device is configured to provide a first signal in response to completing a power-up sequence of the first memory device. The integrated circuit includes a second memory device coupled to the data bus. The second memory device is configured to provide a second signal in response to completing a power-up sequence of the second memory device. The integrated circuit includes a controller configured to access the first memory device and the second memory device based on the first signal and the second signal.

19 Claims, 4 Drawing Sheets

INTEGRATED CIRCUIT INCLUDING MULTIPLE MEMORY DEVICES

BACKGROUND

One type of memory includes a controller and one or more memory devices communicatively coupled to the controller. The memory devices may include volatile memory devices and/or non-volatile memory (NVM) devices. The volatile memory devices may include random access memory (RAM) devices, such as dynamic random access memory (DRAM) devices, synchronous dynamic random access memory (SDRAM) devices, double data rate synchronous dynamic random access memory (DDR-SDRAM) devices, low power SDRAM (e.g., MOBILE-RAM) devices, or other suitable memory devices. The non-volatile memory devices may include RAM devices, such as flash memory devices, resistive memory devices (e.g., phase change memory devices, magnetic memory devices), or other suitable RAM devices. The non-volatile memory devices may also include read-only memory (ROM) devices, such as programmable read-only memory (PROM) devices, electrically erasable programmable read-only memory (EEPROM) devices, or other suitable ROM devices.

A memory including a controller and one or more memory devices may include a single data bus, which is shared between all the memory devices and coupled to the controller. The controller writes data to each of the memory devices and reads data from each of the memory devices through the shared data bus.

A typical power-up sequence for the memory proceeds as follows. First, power is applied to the controller. With power applied to the controller, the controller starts to power-up the memory devices. After a short time, the controller supply voltage, such as $V_{DD}$, becomes stable. A short time after the controller supply voltage stabilizes, the controller clock becomes stable. Then, after a set time from the stabilization of the controller clock, such as 200 µs, the controller can begin accessing the memory devices. The wait time between the controller clock stabilizing and the controller beginning to access the memory devices is provided to insure that all the memory devices have completed their power-up sequences.

Typically, DRAM devices complete their power-up sequences earlier (e.g., at about 100 µs) than the controller wait time. In addition, the power-up sequences for non-volatile memory devices are typically less than for volatile memory devices (e.g., about 30 µs).

For these and other reasons, there is a need for the present invention

SUMMARY

One embodiment provides an integrated circuit. The integrated circuit includes a data bus and a first memory device coupled to the data bus. The first memory device is configured to provide a first signal in response to completing a power-up sequence of the first memory device. The integrated circuit includes a second memory device coupled to the data bus. The second memory device is configured to provide a second signal in response to completing a power-up sequence of the second memory device. The integrated circuit includes a controller configured to access the first memory device and the second memory device based on the first signal and the second signal.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "tailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
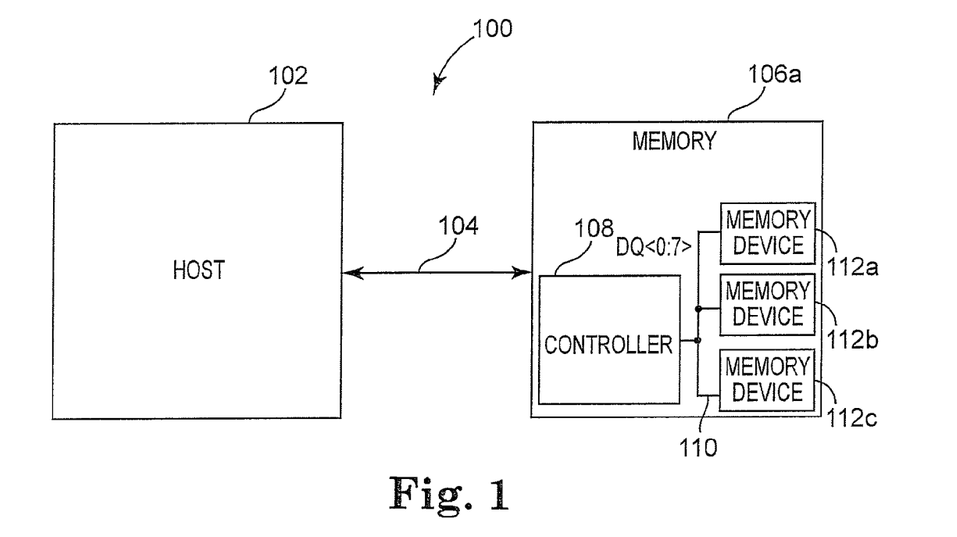
FIG. 1 is a block diagram illustrating one embodiment of a system.

FIG. 1 is a block diagram illustrating one embodiment of a system 100. System 100 includes a host 102 and a memory 106a. Host 102 is electrically coupled to memory 106a through memory communications path 104. Memory 106a includes a controller 108, a data bus 110, and memory devices 112a-112c. Controller 108 is electrically coupled to memory devices 112a-112c through data bus 110. In other embodiments, memory 106a includes any suitable number of memory devices 112.

During the power-up sequence for memory 106a, controller 108 receives signals from memory devices 112a-112c indicating when each memory device 112a-112c has completed its power-up sequence. In one embodiment, once all memory devices 112a-112c have completed their power-up sequences, controller 108 may begin accessing each of the memory devices 112a-112c. In another embodiment, in which one of the memory devices 112a-112c is a non-volatile memory device, once the non-volatile memory device has completed its power-up sequence, controller 108 may begin accessing the non-volatile memory device while the remaining memory devices are completing their power-up sequences.

In one embodiment host 102 includes a computer (e.g., desktop, laptop, handheld), portable electronic device (e.g., cellular phone, personal digital assistant (PDA), MP3 player, video player) or any other suitable device that uses memory.

Host 102 includes logic, firmware, and/or software for accessing memory 106a. In one embodiment, host 102 includes a microcontroller, microprocessor, or other suitable device capable of passing a clock signal, address signal, command signals, and data signals to memory 106a through memory communication path 104. Host 102 passes the clock signal, address signals, command signals, and data signals to memory 106a through memory communication path 104 to read data from and write data to memory 106a.

Memory 106a includes circuits for communicating with host 102 through memory communication path 104 and for reading and writing data in memory 106a. Memory 106a responds to memory read requests from host 102 and passes the requested data to host 102. Memory 106a responds to write requests from host 102 and stores data in memory 106a passed from host 102.

Controller 108 includes a microprocessor, microcontroller, or other suitable logic circuitry for controlling the operation of memory 106a. Controller 108 controls read and write operations to memory devices 112a-112c. Controller 108 receives data read from memory devices 112a-112c through data bus 110 and passes data to write to memory devices 112a-112c through data bus 110. In one embodiment, data bus 110 includes eight data lines (DQ <0:7>). In other embodiments, data bus 110 includes any suitable number of data lines, such as 16, 32, or 64.

Each memory device 112a-112c is a volatile memory device or a non-volatile memory (NVM) device. The volatile memory devices may include random access memory (RAM) devices, such as dynamic random access memory (DRAM) devices, synchronous dynamic random access memory (SDRAM) devices, double data rate synchronous dynamic random access memory (DDR-SDRAM) devices, low power SDRAM (e.g., MOBILE-RAM) devices, or other suitable memory devices. The non-volatile memory devices may include RAM devices, such as flash memory devices, resistive memory devices (e.g., phase change memory devices, magnetic memory devices), or other suitable RAM devices. The non-volatile memory devices may also include read-only memory (ROM) devices, such as programmable read-only memory (PROM) devices, electrically erasable programmable read-only memory (EEPROM) devices, or other suitable ROM devices.

In one embodiment, each memory device 112a-112c is assigned a data line of data bus 110 or another suitable signal line of the memory device on which each memory device 112a-112c outputs a "ready" or "not ready" signal. The "ready" signal is output by a memory device 12a-112c once the memory device has completed its power-up sequence. In one embodiment, memory device 112a is assigned to data line DQ<0>, memory device 112b is assigned to data line DQ<1>, and memory device 112c is assigned to data line DQ<2>. Data or signal lines of each memory device 112a-112c that are not assigned to output the "ready" or "not ready" signal for the memory device are not driven and are set to a high impedance to prevent shorts.

Upon initialization of a power-up of memory 106a, each memory device 112a-112c outputs a "not ready" signal on their assigned data or signal line. Once a memory device 112a-112c has completed its power-up sequence, the memory device 112a-112c outputs a "ready" signal on their assigned data or signal line. In one embodiment, the "ready" signal is a logic high signal and the "not ready" signal is a logic low signal. In another embodiment, the "ready" signal is a logic low signal and the "not ready" signal is a logic high signal. Once controller 108 receives a "ready" signal from each memory device 112a-112c, controller 108 may begin accessing the memory devices 112a-112c. Once controller 108 begins accessing the memory devices 112a-112c, the data or signal lines assigned to each memory device 112a-112c for providing the "ready" or "not ready" signal revert to passing data or other signals between controller 108 and each memory device 112a-112c.

Figure 2:
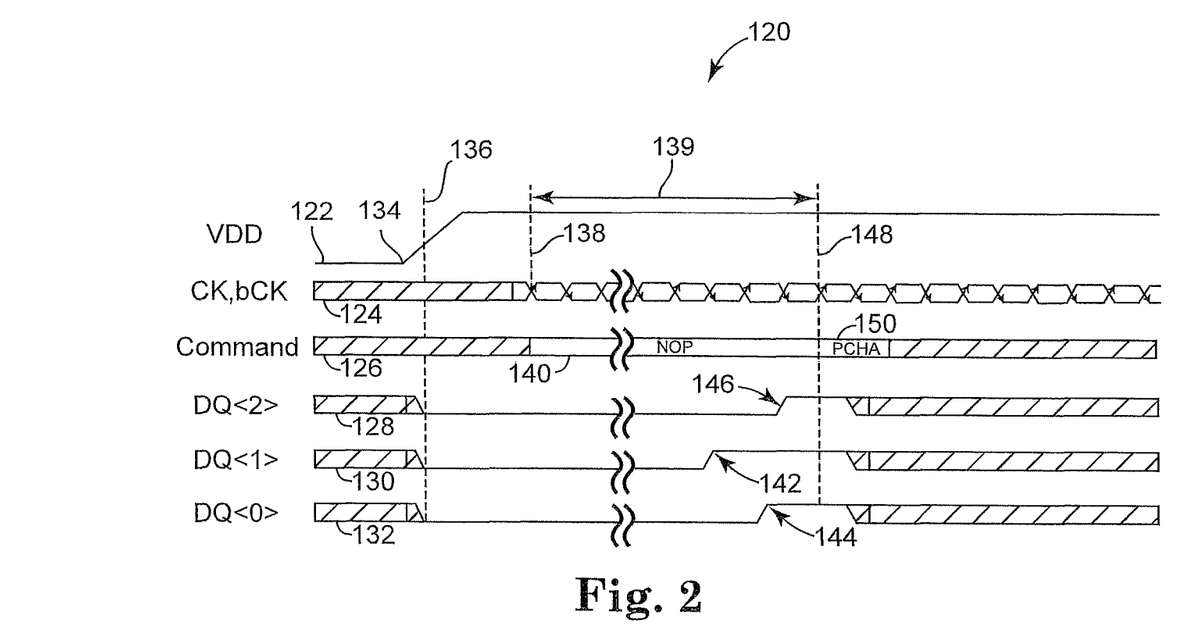
FIG. 2 is a timing diagram illustrating one embodiment of the timing of signals for a power-up sequence of the memory.

FIG. 2 is a timing diagram 120 illustrating one embodiment of the timing of signals for a power-up sequence of memory 106a. Timing diagram 120 includes $V_{DD}$ signal 122, clock (CK) and inverted clock (bCK) signals 124 provided by controller 108, command signal 126 provided by controller 108, DQ<2> signal 128 assigned to memory device 112c, DQ<1> signal 130 assigned to memory device 112b, and DQ<0> signal 132 assigned to memory device 112a.

Host 102 initiates the power-up sequence of memory 106a at 134. In response to initiating the power-up sequence, $V_{DD}$ signal 122 begins to increase to its preset voltage. Once $V_{DD}$ signal 122 reaches a specific voltage, such as two times the threshold voltage ($V_{th}$) as indicated at 136, controller 108 initializes the power-up sequences of memory devices 112a-112c. In response to initializing the power-up sequences of memory devices 112a-112c, memory device 112a outputs a logic low DQ<0> signal 132 on the DQ<0> data line of data bus 110, memory device 112b outputs a logic low DQ<1> signal 130 on the DQ<1> data line of data bus 110, and memory device 112c outputs a logic low DQ<2> signal 128 on the DQ<2> data line of data bus 110. The logic low DQ<0> signal 132, the logic low DQ<1> signal 130, and the logic low DQ<2> signal 128 indicate to controller 108 that memory devices 112a-112c have not completed their power-up sequences and are therefore "not ready." At 138, CK and bCK signals 124 are stabilized. With CK and bCK signals 124 stabilized and memory devices 112a-112c "not ready," controller 108 does not issue any commands as indicated on command signal 126 at 140.

In response to memory device 112a completing its power-up sequence, memory device 112a transitions DQ<0> signal 132 from a logic low "not ready" to a logic high "ready" as indicated at 144. In response to memory device 112b completing its power-up sequence, memory device 112b transitions DQ<1> signal 130 from a logic low "not ready" to a logic high "ready" as indicated at 142. In response to memory device 112c completing its power-up sequence, memory device 112c transitions DQ<2> signal 128 from a logic low "not ready" to a logic high "ready" as indicated at 146.

In response to all memory devices 112a-112c providing "ready" signals, controller 108 determines that all memory devices 112a-112c have completed their power-up sequences. In response to controller 108 determining that all memory devices 112a-112c have completed their power-up sequences, controller 108 begins accessing memory devices 112a-112c as indicated at 148. In one embodiment, where memory devices 112a-112c are DRAM devices, controller 108 begins accessing memory devices 112a-112c by issuing a precharge all (PCHA) command on command signal 126 at 150. In one embodiment, the time as indicated at 139 between the CK and bCK signals 124 stabilizing and the precharge all command is less than 200 μs.

Figure 3:
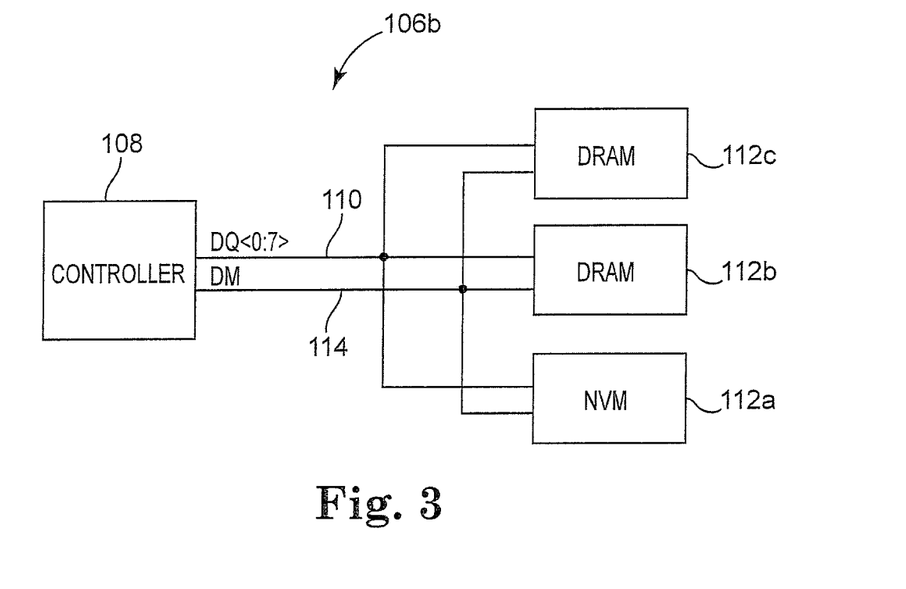
FIG. 3 is a block diagram illustrating another embodiment of a memory.

FIG. 3 is a block diagram illustrating another embodiment of a memory 106b. Memory 106b is similar to memory 106a previously described and illustrated with reference to FIG. 1, except memory 106b includes data mask (DM) line or signal path 114. In addition, memory device 112a is a non-volatile memory device, such as a flash memory device, and memory devices 112b and 112c are volatile memory devices, such as DRAM memory devices.

Controller 108 is electrically coupled to non-volatile memory device 112a and DRAM memory devices 112b and 112c through data bus 110 and DM signal path 114. Non-volatile memory device 112a has a shorter power-up sequence than DRAM memory devices 112b and 112c. In one embodiment, non-volatile memory device 112a is assigned a data line of data bus 110 or another suitable signal line of the memory device on which memory device 112a outputs a "ready" or "not ready" signal. The "ready" signal is output by memory device 112a once memory device 112a has completed its power-up sequence. In one embodiment, memory device 112a is assigned to data line DQ<0>. In other embodiments, memory device 112a is assigned to another suitable data or signal line. In this embodiment, each DRAM memory device 112b and 112c outputs a "ready" or "not ready" signal on DM signal path 114. The "ready" signal is output by a memory device 112b and 112c once the memory device has completed its power-up sequence.

Upon initialization of a power-up sequence of memory 106b, non-volatile memory device 112a outputs a "not ready" signal on its assigned data or signal line and DRAM memory devices 112b and 112c each output a "not ready" signal on DM signal path 114. Once memory device 112a has completed its power-up sequence, memory device 112a outputs a "ready" signal on its assigned data or signal line. In one embodiment, the "ready" signal is a logic high signal and the "not ready" signal is a logic low signal. In another embodiment, the "ready" signal is a logic low signal and the "not ready" signal is a logic high signal. Once controller 108 receives the "ready" signal from memory device 112a, controller 108 may begin accessing memory device 112a. Once controller 108 begins accessing memory device 112a, the data or signal line assigned to memory device 112a for providing the "ready" signal reverts to passing data or other signals between controller 108 and each memory device 112a-112c.

Once a memory device 112b and 112c has completed its power-up sequence, the memory device outputs a "ready" signal on DM signal path 114. The "ready" signal is provided by setting the DM output to a high impedance and the "not ready" signal is provided by setting the DM output to logic low. Once controller 108 receives a "ready" signal from both memory devices 112b and 112c (i.e., the DM outputs of both memory devices 112b and 112c are set to high impedance), controller 108 may begin accessing the memory devices 112b and 112c. Once controller 108 begins accessing the memory devices 112b and 112c, DM signal path 114 reverts to passing mask data between controller 108 and each memory device 112a-112c.

Figure 4:
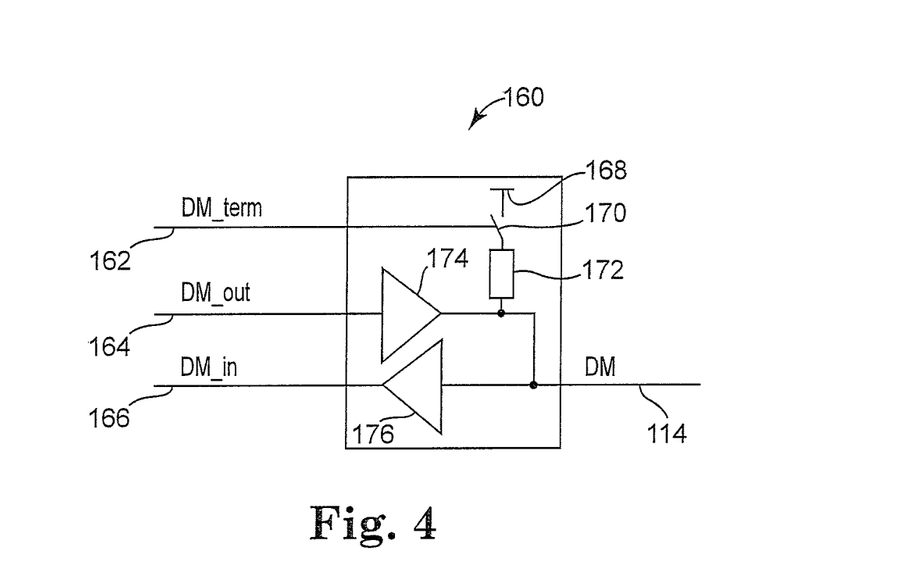
FIG. 4 is a schematic diagram illustrating one embodiment of a data mask signal input and output circuit within the controller.

FIG. 4 is a schematic diagram illustrating one embodiment of a data mask signal input and output circuit 160 within controller 108. Circuit 160 includes a power source 168, a switch 170, a resistor 172, an output buffer 174, and an input buffer 176. Power source 168 is electrically coupled to one side of switch 170. The control input of switch 170 receives a data mask termination (DM_term) signal on DM_term signal path 162. The other side of switch 170 is electrically coupled to one side of resistor 172. The other side of resistor 172 is electrically coupled to the output of output buffer 174 and the input of input buffer 176 through DM signal path 114. The input of output buffer 174 receives a data mask output (DM_out) signal on DM_out signal path 164. The output of input buffer 176 provides a data mask input (DM_in) signal on DM_in signal path 166.

In response to a logic high DM_term signal on DM_term signal path 162, switch 170 is closed to electrically couple power source 168 to resistor 172. In response to a logic low DM_term signal on DM_term signal path 162, switch 170 is opened to electrically decouple power source 168 from resistor 172. In another embodiment, the logic levels of the DM_term signal for opening and closing switch 170 are reversed. Buffer 174 buffers the DM_out signal on DM_out signal path 164 to provide the DM signal on DM signal path 114 during write operations. Buffer 176 buffers the signal on DM signal path 114 to provide the DM_in signal on DM_in signal path 166 during the power-up sequence of memory 106b.

During the power-up sequence of memory 106b, controller 108 provides a signal on DM_term signal path 162 to close switch 170 such that power source 168 is coupled to resistor 172. In response to at least one of DRAM memory devices 112b and 112c outputting a logic low "not ready" signal on DM signal path 114, the DM_in signal on DM_in signal path 166 is logic low. In response to both DRAM memory devices 112b and 112c setting their DM outputs to a high impedance "ready," DM signal path 114 is driven logic high through resistor 172 by power source 168. Therefore, the DM_in signal on DM_in signal path 166 is logic high.

In response to a logic high DM_in signal on DM_in signal path 166, controller 108 provides a signal on DM_term signal path 162 to open switch 170 to disconnect power supply 168 from resistor 172. Also in response to a logic high DM_in signal on DM_in signal path 166, controller 108 begins accessing DRAM memory devices 112b and 112c. During write operations, controller 108 may provide data mask signals on DM_out signal path 164 to pass to memory devices 112a-112c through DM signal path 114.

Figure 5:
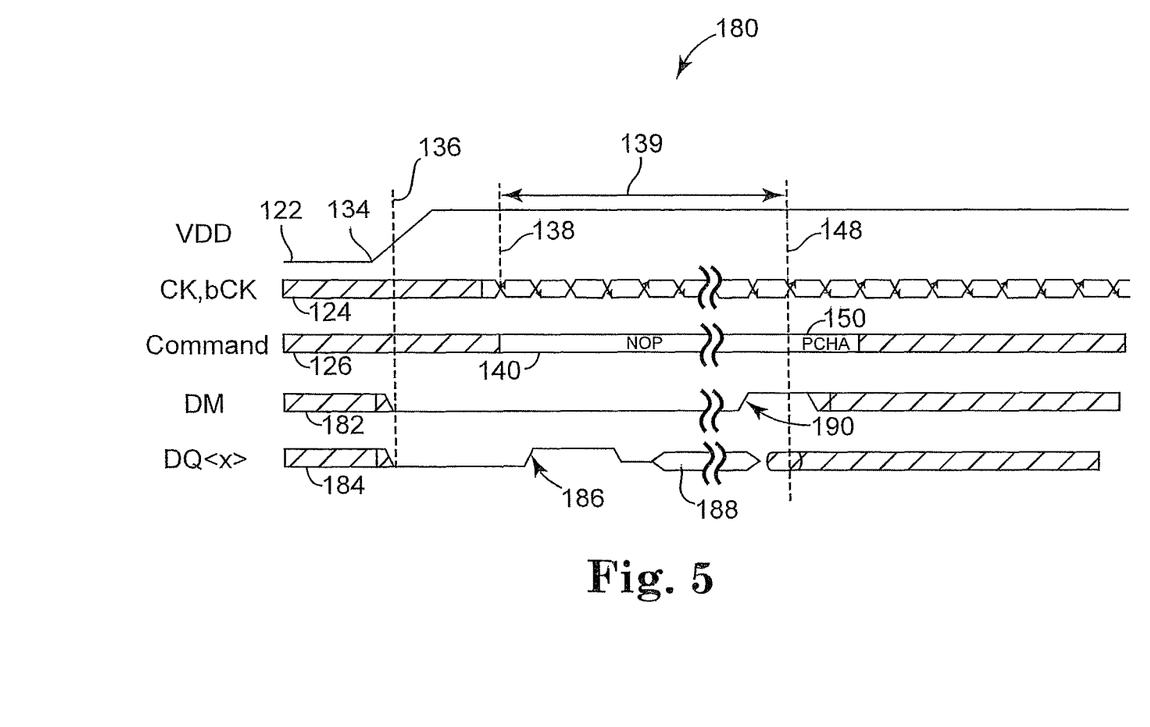
FIG. 5 is a timing diagram illustrating another embodiment of the timing of signals for a power-up sequence of the memory.

FIG. 5 is a timing diagram 180 illustrating one embodiment of the timing of signals for a power-up sequence of memory 106b. Timing diagram 180 includes $V_{DD}$ signal 122, CK and bCK signals 124 provided by controller 108, command signal 126 provided by controller 108, DM signal 182 on DM signal path 114, and DQ<x> signal 184 assigned to memory device 112a, where "x" is one of the data lines of data bus 110.

Host 102 initiates the power-up sequence of memory 106a at 134. In response to initiating the power-up sequence, $V_{DD}$ signal 122 begins to increase to its preset voltage. Once $V_{DD}$ signal 122 reaches a specific voltage, such as two times the threshold voltage ($V_{th}$) as indicated at 136, controller 108 initializes the power-up sequences of memory devices 112a-112c. In response to initializing the power-up sequences of memory devices 112a-112c, memory device 112a outputs a logic low DQ<x> signal 184 on the DQ<x> data line of data bus 110, memory device 112b outputs a logic low DM signal 182 on DM signal path 114, and memory device 112c outputs a logic low DM signal 182 on. DM signal path 114. The logic low DQ<x> signal 184 and the logic low DM signal 182 indicate to controller 108 that memory devices 112a-112c have not completed their power-up sequences and are therefore "not ready." At 138, CK and bCK signals 124 are stabilized. With CK and bCK signals 124 stabilized and memory devices 112a-112c "not ready," controller 108 does not issue any commands as indicated on command signal 126 at 140.

In response to non-volatile memory device 112a completing its power-up sequence, memory device 112a transitions the DQ<x> signal 184 from a logic low "not ready" to logic high "ready" as indicated at 186. In response to non-volatile memory device 112a completing its power-up sequence, controller 108 begins accessing non-volatile memory device 112a as indicated at 188.

In response to both memory devices 112b and 112c completing their power-up sequences, memory devices 112b and 112c transition the DM signal 182 from a logic low "not ready" to a logic high "ready" as indicated at 190. In response to the logic high DM signal 182, controller 108 determines that both memory devices 112b and 112c have completed their power-up sequences. In response to controller 108 determining that both memory devices 112b and 112c have completed their power-up sequences, controller 108 begins accessing memory devices 112b and 112c as indicated at 148. In one embodiment, controller 108 begins accessing memory devices 112b and 112c by issuing a precharge all (PCHA) command on command signal 126 at 150. In one embodiment, the time as indicated at 139 between the CK and bCK signals 124 stabilizing and the precharge all command is less than 200 μs.

Embodiments of the present invention provide a memory including multiple memory devices sharing a common data bus. A controller coupled to the memory devices receives signals indicating when the memory devices have completed their power-up sequences. The controller may begin accessing a memory device once it has completed its power-up sequence. Since the controller does not wait a set time after the controller clock becomes stable before accessing the memory devices, the memory may be accessed sooner than typical memories.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. An integrated circuit comprising:
a data bus having a plurality of signal conductor lines;
a first memory device directly coupled to the data bus, the first memory device to provide a first not ready signal on a predetermined one of the plurality of signal conductor lines in response to an initialization of a power-up sequence of the first memory device and to provide a first ready signal on the predetermined one of the plurality of signal conductor lines in response to completing the power-up sequence of the first memory device;
a second memory device directly coupled to the data bus, the second memory device to provide a second not ready signal on a predetermined another of the plurality of signal conductor lines in response to an initialization of a power-up sequence of the second memory device and to provide a second ready signal on the predetermined another of the plurality of signal conductor lines in response to completing the power-up sequence of the second memory device; and
a controller directly coupled to the data bus, the controller to receive the first not ready signal and the first ready signal from the first memory device via the predetermined one of the plurality of signal conductor lines, to receive the second not ready signal and the second ready signal from the second memory device via the predetermined another of the plurality of signal conductor lines, and to access the first memory device and the second memory device based on the first ready signal and the second ready signal;
wherein the first memory device is configured to input or output data on the predetermined one of the plurality of signal conductor lines after the controller accesses the first memory; and
wherein the second memory device is configured to input or output data on the predetermined another of the plurality of signal conductor lines after the controller accesses the second memory.

2. The integrated circuit of claim 1, wherein the first memory device comprises a non-volatile memory device, and wherein the second memory device comprises a volatile memory device.

3. The integrated circuit of claim 2, further comprising:
a data mask line directly coupled to the second memory device and directly coupled to the controller,
wherein the first memory device is to provide the first not ready signal and the first ready signal on a data line of the data bus, and
wherein the second memory device is to provide the second not ready signal and the second ready signal on the data mask line.

4. The integrated circuit of claim 3, wherein the controller is to access the first memory device in response to the first ready signal and access the second memory device in response to the second ready signal.

5. The integrated circuit of claim 1, wherein the first memory device is to provide the first not ready signal and the first ready signal on a first data line of the data bus, and
wherein the second memory device is to provide the second not ready signal and the second ready signal on a second data line of the data bus.

6. The integrated circuit of claim 5, wherein the controller is to access the first memory device and the second memory device in response to receiving both the first ready signal and the second ready signal.

7. A system comprising:
a host; and
a memory communicatively coupled to the host, the memory comprising:
a data bus having a plurality of signal conductor lines;
a first memory device to provide a first not ready signal on a predetermined one of the plurality of signal conductor lines in response to an initialization of a power-up sequence of the first memory device and to provide a first ready signal on the predetermined one of the plurality of signal conductor lines in response to completing the power-up sequence of the first memory device;
a second memory device to provide a second not ready signal on a predetermined another of the plurality of signal conductor lines in response to an initialization of a power-up sequence of the second memory device and to provide a second ready signal on the predetermined another of the plurality of signal conductor lines in response to completing the power-up sequence of the second memory device; and
a controller for receiving the first not ready signal and the first ready signal from the first memory device via the predetermined one of the plurality of signal conductor lines, for receiving the second not ready signal and the second ready signal from the second memory device via the predetermined another of the plurality of signal conductor lines, and for accessing the first memory device and the second memory device based on the first ready signal and the second ready signal; and
wherein the first memory device is configured to input or output data on the predetermined one of the plurality of signal conductor lines after the controller accesses the first memory; and
wherein the second memory device is configured to input or output data on the predetermined another of the plurality of signal conductor lines after the controller accesses the second memory.

8. The system of claim 7, wherein the first memory device comprises a non-volatile memory device, and
wherein the second memory device comprises a volatile memory device.

9. The system of claim 7, wherein the first memory device is to output the first not ready signal and the first ready signal on a data mask line, the data mask line directly coupled between the first memory device, the second memory device, and the controller; and
wherein the second memory device is to output the second not ready signal and the second ready signal on the data mask line.

10. The system of claim 7, wherein the first memory device is to output the first not ready signal and the first ready signal on a first data line of a data bus, the data bus directly coupled between the first memory device, the second memory device, and the controller; and
wherein the second memory device is to output the second not ready signal and the second ready signal on a second data line of the data bus.

11. The system of claim 7, wherein the first memory device is to output the first not ready signal and the first ready signal on a data mask line, the data mask line directly coupled between the first memory device, the second memory device, and the controller; and
wherein the second memory device is to output the second not ready signal and the second ready signal on a data line of a data bus, the data bus directly coupled between the first memory device, the second memory device, and the controller.

12. The system of claim 7, wherein the controller is to access the first memory device in response to the first ready signal before receiving the second ready signal.

13. A method for operating a memory, the method comprising:
initializing a first power-up sequence for a first memory device coupled to a data bus, the data bus having a plurality of signal conductor lines;
providing a first not ready signal from the first memory device on a predetermined one of the plurality of signal conductor lines in response to initializing the first power-up sequence;
providing a first ready signal from the first memory device on the predetermined one of the plurality of signal conductor lines in response to completing the first power-up sequence;
initializing a second power-up sequence for a second memory device coupled to the data bus;
providing a second not ready signal from the second memory device on a predetermined another of the plurality of signal conductor lines in response to initializing the second power-up sequence;
providing a second ready signal from the second memory device on the predetermined another of the plurality of signal conductor lines in response to completing the second power-up sequence;
accessing the first memory device and the second memory device based on the first ready signal provided from the first memory device and the second ready signal provided from the second memory device;
inputting data into or reading data from the first memory device using at least the redetermined one of the plurality of signal conductor lines; and
inputting data into or reading data from the second memory device using at least the predetermined another of the plurality of signal conductor lines.

14. The method of claim 13, wherein initializing the first power-up sequence for the first memory device comprises initializing the first power-up sequence for a dynamic random access memory device, and
wherein initializing the second power-up sequence for the second memory device comprises initializing the second power-up sequence for a non-volatile memory device.

15. The method of claim 13, wherein providing the first ready signal comprises providing the first ready signal on a first data line of the data bus,
wherein providing the second ready signal comprises providing the second ready signal on a second data line of the data bus, and
wherein accessing the first memory device and the second memory device comprises accessing the first memory device and the second memory device in response to receiving both the first ready signal and the second ready signal.

16. The method of claim 13, wherein providing the first ready signal comprises providing the first ready signal on a data mask line,
wherein providing the second ready signal comprises providing the second ready signal on a data line of the data bus, and
wherein accessing the first memory device and the second memory device comprises accessing the first memory device in response to receiving the first ready signal and accessing the second memory device in response to receiving the second ready signal.

17. A method for operating a memory, the method comprising:
initializing a first power-up sequence for a non-volatile memory device directly coupled to a data bus;
providing a first ready signal from the non-volatile memory device through a predetermined one of a plurality of data lines of the data bus in response to completing the first power-up sequence;
initializing a second power-up sequence for a volatile memory device directly coupled to the data bus;
accessing the non-volatile memory device through the data bus in response to the completion of the first power-up sequence before the completion of the second power-up sequence;
wherein accessing the non-volatile memory device comprises accessing the non-volatile memory device in response to the first ready signal, and wherein the predetermined one of the plurality of data lines of the data bus carries data when accessing the non-volatile memory device.

18. A method for operating a memory, the method comprising:
initializing a first power-up sequence for a non-volatile memory device directly coupled to a data bus;
providing a first ready signal from the non-volatile memory device through a predetermined one of a plurality of data lines of the data bus in response to completing the first power-up sequence;
initializing a second power-up sequence for a volatile memory device directly coupled to the data bus,
providing a second ready signal from the volatile memory device through a data mask line in response to completing the second power-up sequence;

accessing the non-volatile memory device through the data bus in response to the completion of the first power-up sequence before the completion of the second power-up sequence;

accessing the volatile memory device through the data bus in response to the second ready signal; and wherein the data mask line carries data mask signal information when accessing the volatile memory device.

19. The method of claim 17, wherein initializing the second power-up sequence for the volatile memory device comprises initializing the second power-up sequence for a dynamic random access memory device.

* * * * *